E. BOYDEN.
Elevators.

No. 142,555. Patented September 9, 1873.

Witnesses:
D. Hall Rice
J. F. Haskell

Inventor:
Erastus Boyden

UNITED STATES PATENT OFFICE.

ERASTUS BOYDEN, OF LOWELL, MASSACHUSETTS.

IMPROVEMENT IN ELEVATORS.

Specification forming part of Letters Patent No. 142,555, dated September 9, 1873; application filed June 3, 1873.

*To all whom it may concern:*

Be it known that I, ERASTUS BOYDEN, of Lowell, in the county of Middlesex and Commonwealth of Massachusetts, have invented a new and useful Improvement in Elevators for Cotton-Laps, to be used in mills, of which the following is a specification:

My improvement consists, first, in providing an elevator for cotton-laps and other like articles with an automatic starting and stopping device, so that the same shall elevate the laps from the table of the machine successively out of the way, and stop automatically at the proper point to receive another lap, the object of this part of my invention being to save the expense and trouble of a person to watch and stop and start the elevator properly to receive and deliver the laps; second, in providing the elevator with a table and trough, connected therewith as hereinafter described, for the purpose of receiving the laps thereon and removing therefrom the metal lap-roll on which the lap is formed in the lapper, and inserting in place of the lap-roll the wooden rod or bar which supports the lap while being transported on the elevator; third, in providing the elevator with a set of double or reverse hooks or carriers, so that they may transport the rods or bars which support the laps after they are removed from the latter down on the side of the elevator opposite to the ascending laps, to be again used in transporting laps up the elevator.

Figure 2:
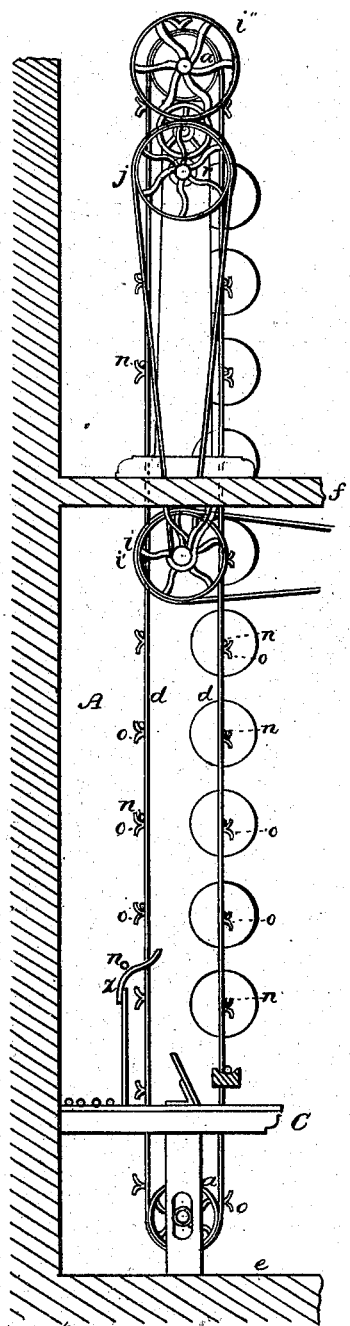
Figure 1:
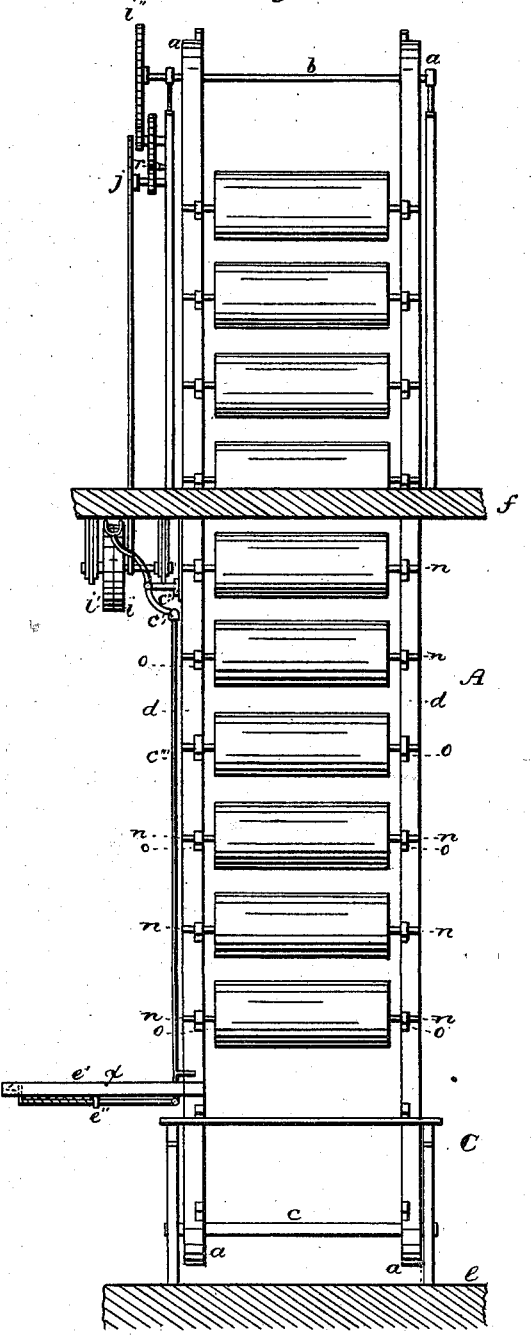

Figure 1 is a front view of my improvement as attached to an elevator. Fig. 2 is a side view of the same.

A is an elevator, formed of two bands, $d\ d$, of leather or other suitable material, passing around the wheels $a\ a$ at some distance from each other upon their axis. The wheels $a\ a$ at the top of the elevator are upon the same axis $b$, and those at the bottom are also upon the same axis $c$, whereby a simultaneous and uniform ascending and descending motion is insured to the bands $d\ d$. The elevator A passes up from the floor $e$ of the lapper-room through the floor $f$ of the room above, where the laps are to be used. C is a table placed at a sufficient distance above the floor $e$ to conveniently receive the laps as they are brought from the lapper. At the side of the elevator is placed a shaft carrying a tight and loose pulley, $i\ i'$, over which runs a belt connecting them with suitable motive power for driving the machine. On the same shaft with the tight and loose pulley $i\ i'$ is a second pulley, which is connected by a belt with the pulley $j$, which, in turn, communicates motion, by intermediate pinions, to the gear-wheel $i''$, which is attached to and drives the shaft on which are the upper wheels $a\ a$, thus operating the elevator. Connected with the belt which drives the pulleys $i\ i'$ is a belt-shipper, $c'$, for shifting the belt from the tight pulley $i$ to the loose pulley $i'$, or vice versa, this belt-shipper being pivoted on the arm $c''$, and having attached to its end, opposite the belt, the rod $c'''$, extending down below a trough, $e'$, near the table C. The trough $e'$ is placed at the side of the table C, and a little above it, extending in a line with the rods $n\ n$, which support the laps in hooks upon the elevator. At the lower end of the rod $c'''$ is pivoted the rod $e''$, which extends under the trough $e'$, and has its outer end turned upward at a right angle, and projecting in a longitudinal slot through the bottom of the trough upward into it, so as to be capable of being moved in the trough along the direction of its length. On the bands $d\ d$ are firmly secured hooks $o\ o$, adapted to receive and carry the ends of the rods $n\ n$ at suitable distances apart, the hooks $o\ o$ on one band being directly opposite those on the other. The rod $c'''$ being suspended upon the belt-shipper at its upper end, its weight is sufficient to keep the driving-belt running upon the fast pulley $i$ and the elevator in operation, while at the same time it can swing away from the elevator when the rod $e''$ is moved along in the slot in the trough $e'$. On the rod $c'''$ is a short arm, $x$, just above the trough, projecting at right angles, so as to engage with the hooks $o$ on the adjacent band $d$ as they rise with the band.

When the arm $x$ and rod $c'''$ are lifted and supported by one of the hooks $o$, the driving-belt is thereby shipped onto the loose pulley $i'$, and the elevator stops. On the lower side of the trough $e'$ the rod $e''$ is held toward the elevator by a spring, which keeps it and the arm $x$ in a position to engage with the hooks $o$ as they rise.

In order to operate the elevator, one of the hooks $o$ is set so as to lift the arm $x$ and rod $c'''$ and shift the driving-belt onto the loose pulley $i'$. The lap is placed by a workman on the table C, having a heavy iron lap-roll, on which it is formed, passing longitudinally through its center, the ends of which are made to rest very nearly against the faces of the bands $d$ $d$ at each end of the lap, the bands being far enough apart to admit the length of the lap between them. The workman then takes one of the rods $n$, which is long enough for its ends to rest in the opposite hooks $o$ $o$, and, placing the end of the rod against the end of the lap-roll in the lap, shoves the latter out (the rod replacing it) in the direction of and into the trough $e'$. Just as the lap-roll leaves the lap its outer end comes in contact with the projecting part of the rod $e''$ in the trough, and moves the rod along the trough outward, drawing the rod $c'''$ away from the elevator and the arm $x$ out of the hook $o$, and allowing the weight of the rod $c'''$ depending from the belt-shipper to ship the driving-belt onto the tight pulley $i$, and set the elevator in motion. The workman adjusts the ends of the rod $n$ into the hooks $o$ $o$ at each end of the lap, and the elevator carries the lap upward. The workman then removes the lap-roll from the trough $e'$, and the spiral spring throws the rod $e''$, rod $c'''$, and arm $x$ into place, ready to engage with the next hook $o$ as it rises. When the next hook $o$ reaches the arm $x$ it lifts the arm, ships the driving-belt onto the loose pulley, and the elevator stops in position to receive the next lap.

The hooks $o$ $o$ on the bands $d$ $d$ are made double or reverse, so as to carry down the rods $n$ $n$ from the upper floor of the mill as fast as they are removed from the laps. On the descending side of the elevator an arm, $z$, is placed, so as to discharge the rods $n$ upon the table as they are brought down. A brake or pawl, $r$, is applied to the pinion which is driven by the pulley $j$, so as to prevent the pinion from moving in the direction opposite to that given it when driving the elevator. This brake or pawl thus keeps the elevator and its load stationary when the driving-belt is running on the loose pulley $i'$.

What I claim as new and my invention is—

1. In combination with the elevator A, the automatic stopping device, consisting of the arm $x$ and belt-shipper $c'$, connected by the rod $c'''$, substantially as described.

2. In combination with the elevator A, the automatic starting device, consisting of the trough $e'$, rod $e''$, rod $c'''$, provided with its arm $x$ and belt-shipper $c'$, substantially as described.

3. In combination with the elevator A, the table C for receiving the lap while the lap-roll is being removed therefrom, substantially as described.

4. The trough $e'$, in combination with the table C, placed at a proper height to receive the lap-roll from the lap upon the table, substantially as described.

5. The double or reverse hooks $o$ $o$, attached to the elevator A, so as to transport the rods $n$ on the opposite side from the laps, substantially as described.

ERASTUS BOYDEN.

Witnesses:
   D. HALL RICE,
   J. F. HASKELL.